United States Patent Office 3,479,388
Patented Nov. 18, 1969

3,479,388
PROCESS FOR PREPARING N-METHYL-
GLYCINONITRILE
David A. Daniels, Catonsville, Md., assignor to W. R.
Grace & Co., New York, N.Y., a corporation of
Connecticut
No Drawing. Filed Dec. 26, 1967, Ser. No. 693,174
Int. Cl. C07c *121/42, 101/04*
U.S. Cl. 260—465.5          8 Claims

ABSTRACT OF THE DISCLOSURE

In abstract this invention is directed to a process for forming N-methylglycinonitrile by; (a) forming a first mixture by mixing hydrogen cyanide and methylamine at about 0–25° C. in a mole ratio of about 0.01–0.20:1; (b) adding glycolonitrile to the first mixture while maintaining the temperature thereof at about 0–10° C., the glycolonitrile being added at a rate to supply about 0.50–0.95 mole of glycolonitrile per mole of methylamine present in the first mixture; and (c) recovering the N-methylglycinonitrile, all as recited hereinafter.

---

This invention is in the field of N-methylglycinonitrile (sarcosinonitrile) preparation.

Prior art methods for preparing sarcosinonitrile are taught by U.S. Patents 3,009,954 and 2,720,540.

In summary, this invention is directed to a process for preparing N-methylglycinonitrile, said process comprising: (a) forming a first mixture by adding substantially anhydrous hydrogen cyanide and a first material selected from the group consisting of substantially anhydrous methylamine and an aqueous methylamine solution analyzing about 10–45% methylamine, said hydrogen cyanide being added at the rate of about 0.01–0.20 mole per mole of methylamine, to a reaction zone while agitating said first mixture as it forms and while maintaining the temperature within said zone at about 0–25° C.; (b) forming N-methyl-glycinonitrile by adding a second material selected from the group consisting of substantially anhydrous glycolonitrile and an aqueous solution of glycolonitrile, analyzing about 30–75% glycolonitrile to the aforesaid mixture in the reaction zone while agitating the first mixture and while maintaining the temperature within the reaction zone at about 0–25° C. said second material being added at a rate to supply 0.5–0.95 mole of glycolonitrile per mole of methylamine present in the first mixture; and (c) recovering the N-methylglycinonitrile.

In preferred embodiments of the process set forth in the above summary:

(1) The methylamine solution analyzes about 30–40% methylamine;

(2) The first mixture is formed by adding hydrogen cyanide to methylamine at the rate of about 0.03–0.10 mole of hydrogen cyanide per mole of methylamine;

(3) The temperature within the reaction zone is maintained at about 1–10° C. while adding hydrogen cyanide to said zone;

(4) The glycolonitrile analyzes about 50–75% glycolonitrile;

(5) The temperature within the reaction zone is maintained at about 1–10° C. while forming N-methylglycinonitrile by adding glycolonitrile to the first mixture in the reaction zone; and (6) The second material (glycolonitrile) to the first mixture is added at a rate to provide about 0.8–0.9 mole of glycolonitrile per mole of methylamine present in the first mixture.

It is an object of this invention to provide a method for synthesizing sarcosinonitrile.

It is an object of this invention to provide an improved method for preparing high quality sarcosinonitrile from methylamine, hydrogen cyanide, and glycolonitrile.

It is another object of this invention to provide a method for synthesizing sarcosinonitrile of exceptionally high quality.

It is another object of this invention to prepare sarcosinonitrile which is substantially free of side-products such as N-methyliminodiacetonitrile ($CH_3N(CH_2CN)_2$) and the like.

As used herein (e.g., in part (b) of the summary, supra) and in the claims the expression "said second material being added at a rate to supply about 0.50–0.95 mole of glycolonitrile per mole of methylamine present in the first mixture" means that glycolonitrile is added to the first mixture at a rate to provide about 0.5–0.95 mole of glycolonitrile for each mole of methylamine added to the aforesaid reaction zone when preparing the aforesaid first mixture. Of course, it is understood that methylamine, being a weak base ($K_b$=ca. $4.4 \times 10^{-4}$), and hydrogen cyanide, being a very weak acid ($K_a$=ca. $7.2 \times 10^{-10}$), may react to at least some extent in the reaction zone wherein the first mixture is formed. Nevertheless, it is clearly understood that, from the standpoint of the stoichiometry involved, substantially all methylamine fed into the reactor zone where preparing the first mixture is present in said first mixture in a form capable of reacting with glycolonitrile to form N-methylglycinonitrile.

Sarcosinonitrile prepared by the process of this invention has been used with excellent results as an intermediate in the preparation of sodium sarcosinate (by the hydrolysis of sarcosinonitrile with aqueous sodium hydroxide); said sodium sarcosinate has, in turn, been acylated with acyl chlorides of fatty acids having about 8–20 carbon atoms to yield surfactants which have been used with excellent results in shampoos (including rug shampoos), floor waxes, and glass cleaners. The derivative prepared by reacting lauroyl chloride with sodium sarcosinate has been especially useful for such purposes.

It is understood that sarcosinonitrile prepared by the method of this invention from an aqueous methylamine solution, or from aqueous glycolonitrile solution, or from aqueous solutions of both methylamine and glycolonitrile will contain water (e.g., will exist as an aqueous solution or as an aqueous slurry).

While substantially anhydrous glycolonitrile is readily prepared (e.g., by adding benzene to an aqueous solution of glycolonitrile and distilling to remove the water as an azeotropic mixture of water and benzene), because of the unstable nature of substantially anhydrous glycolonitrile I prefer to use an aqueous solution of glycolonitrile in the procedure of this invention.

I add a small amount of HCN to methylamine (e.g., ca. 0.01–0.2:1 mole of HCN per mole of methylamine), when preparing sarcosinonitrile by the method of this invention before adding glycolonitrile to the methylamine so that concentration (on a mole basis) of the nitrile component (HCN is a nitrile) of the mixture formed when glycolonitrile is added to the methylamine is always slightly greater than that of the methylene component (glycolonitrile having one nitrile (CN) group and one methylene group ($CH_2$) per molecule). If the concentration of nitrile component of said mixture is not slightly greater than that of the methylene component, undesired side products such as $CH_3N(CH_2CN)_2$ can form, thereby to contaminate the sarcosinonitrile formed.

I generally prefer to recover sarcosinonitrile produced by the method of this invention in the form of a solution or (where using an aqueous solution of glycolonitrile or an aqueous solution of methylamine, or aqueous solutions of both) slurry which can be converted to an alkali metal N-methylglycolate (e.g., sodium N-methylglycolate (sodium sarcosinate)) by hydrolyzing with an alkali metal hydroxide (e.g., NaOH or KOH). However, if desired, the sarcosinonitrile can be separated from water in which it (the sarcosinonitrile) was synthesized by adding hydrogen chloride (or hydrochloric acid), thereby to recover said sarcosinonitrile as a hydrochloride. Alternatively, an alkali metal bisulfate (e.g., NaHSO$_4$, or KHSO$_4$) can be added and the sarcosinonitrile recovered as a bisulfate.

The instant invention will be better understood by referring to the following specific but nonlimiting examples. It is understood that said invention is not limited to these examples which are offered merely as illustrations, and it is also understood that modifications can be made without departing from the spirit and scope of the invention.

EXAMPLE I

A 3 mole portion of a 40% aqueous methylamine (40% CH$_3$NH$_2$) solution was placed in a 4 neck flask, said flask was equipped with a dropping funnel, condenser, thermometer, and stirring bar. The flask and its contents were maintained at about 5–10° C. while stirring and 0.1 mole of liquid substantially anhydrous hydrogen cyanide was added thereto. Subsequently, while stirring the contents of the flask and while maintaining the flask and its contents at about 5–10° C., 2.5 mole of a 70% aqueous glycolonitrile solution (70% HOCH$_2$CN) was slowly added to the flask—the addition of said glycolonitrile taking about 20 minutes. The resulting product was a clear solution having a slight yellow color. Analysis (gas chromatography) showed that said product was an aqueous sarcosinonitrile solution (440 grams) analyzing 41.8% sarcosinonitrile and containing less than about 0.1% CH$_3$N(CH$_2$CN)$_2$. The resulting solution was labeled "Solution A." The yield, based on glycolonitrile used, was about 96% of theory.

EXAMPLE II

The general procedure of Example I was repeated however, in this instance the procedure was modified by; (i) using a pressure reactor; (ii) replacing the methylamine solution with substantially anhydrous methyamine; and (iii) replacing the glycolonitrile solution with freshly prepared substantially anhydrous gycolonitrile. The product was a slightly yellow liquid which, after standing for about 12 hours at room tempearture (ca. 20–25° C.) analyzed about 99.9% sarcosinonitrile. The yield was about 98% of theory. The product contained less than 0.1% CH$_3$N(CH$_2$CN)$_2$.

The term "percent (%)" was used herein, unless otherwise defined where used, means parts per hundred by weight, and the term "parts" as used herein, unless otherwise defined where used, means parts by weight.

I claim:

1. A process for preparing N-methylglycinonitrile, said process comprising:
   (a) forming a first mixture by adding substantially anhydrous hydrogen cyanide and a first material selected from the group consisting of substantially anhydrous methylamine and an aqueous methylamine solution analyzing about 10–45% methylamine, said hydrogen cyanide being added at the rate of about 0.01–0.20 mole per mole of methylamine, to a reaction zone while agitating said first mixture as it forms and while maintaining the temperature within said zone at about 0–25° C.
   (b) forming N-methylglycinonitrile by adding a second material selected from the group consisting of substantially anhydrous glycolonitrile and an aqueous solution of glycolonitrile, analyzing about 30–75% glycolonitrile to the aforesaid first mixture in the reaction zone while agitating the first mixture and while maintaining the temperature within the reaction zone at about 0–25° C.; said second material being added at a rate to supply 0.5–0.95 mole of glycolonitrile per mole of methylamine present in the first mixture; and
   (c) recovering the N-methylglycinonitrile.

2. The process of claim 1 in which the methylamine solution analyzes about 30–40% methylamine.

3. The process of claim 1 in which the first mixture is formed by adding hydrogen cyanide to the methylamine at the rate of about 0.03–0.10 mole per mole of methylamine.

4. The process of claim 1 in which the temperature within the reaction zone is maintained at about 1–10° C. while forming the first mixture.

5. The process of claim 1 in which the glycolonitrile solution analyzes about 50–75% glycolonitrile.

6. The process of claim 1 in which the temperature within the reaction zone is about 1–10° C. while forming N-methylglycinonitrile by adding glycolonitrile to the first mixture in the reaction zone.

7. The process of claim 1 in which the second material is added to the first mixture at a rate to supply about 0.8–0.9 mole of glycolonitrile per mole of methylamine present in the first mixture.

8. The process of claim 1 in which the first material is an aqueous methylamine solution analyzing about 10–45% methylamine and the second material is an aqueous solution of glycolonitrile analyzing about 30–75% glycolonitrile.

References Cited

UNITED STATES PATENTS 3,009,954  11/1961  Leake et al. ____ 260—465.5 XR

JOSEPH P. BRUST, Primary Examiner

U.S. Cl. X.R.

260—534